(12) United States Patent
Jefferies et al.

(10) Patent No.: US 12,005,801 B2
(45) Date of Patent: *Jun. 11, 2024

(54) AC EVSE CLUSTER LOAD BALANCING SYSTEM

(71) Applicant: Schneider Electric USA, Inc., Andover, MA (US)

(72) Inventors: Kevin M. Jefferies, Raleigh, NC (US); Benjamin W. Edwards, Rolesville, NC (US); Matthew L White, Cary, NC (US); Konstantin A. Filippenko, Cary, NC (US); Richard K. Weiler, Wake Forest, NC (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,565

(22) Filed: Aug. 22, 2022

(65) Prior Publication Data
US 2022/0396168 A1    Dec. 15, 2022

Related U.S. Application Data

(63) Continuation of application No. 16/516,580, filed on Jul. 19, 2019, now Pat. No. 11,447,027.

(51) Int. Cl.
*B60L 53/63* (2019.01)
*B60L 50/60* (2019.01)
(Continued)

(52) U.S. Cl.
CPC .............. *B60L 53/63* (2019.02); *B60L 50/60* (2019.02); *B60L 53/67* (2019.02); *H02J 3/26* (2013.01);
(Continued)

(58) Field of Classification Search
CPC ....................................................... B60L 53/63
(Continued)

(56) References Cited

U.S. PATENT DOCUMENTS

| 1,658,948 A | 2/1928 | Slepian |
| 3,202,896 A | 8/1965 | Lewus |

(Continued)

FOREIGN PATENT DOCUMENTS

| CN | 102035227 B | 4/2011 |
| CN | 107499163 B | 12/2017 |

(Continued)

OTHER PUBLICATIONS

Extended European Search Report dated Dec. 22, 2020 for corresponding EP Application No. 20183666.5, 8 pages.

(Continued)

*Primary Examiner* — Jerry D Robbins
(74) *Attorney, Agent, or Firm* — Locke Lord LLP

(57) ABSTRACT

A method, apparatus and computer program product resolve the problem of unbalanced loads in an EVSE cluster of multiple EVSE charging stations. A signal is provided to the EVSEs identifying which phase of the three-phase power source has the highest current. When one of the EVSEs in the cluster determines whether it is connected to an EV's on board charging device, determines whether it is already charging the connected EV, and determines whether the EVSE is using the phase that has the highest current, then the EVSE may transmit a cluster load balancing control signal as a control pilot signal to the EV's onboard charging device to adjust the charging rate of the current that the EV is consuming from the EVSE.

16 Claims, 6 Drawing Sheets

(51) Int. Cl.
   *B60L 53/67* (2019.01)
   *H02J 3/26* (2006.01)
   *H02J 7/00* (2006.01)

(52) U.S. Cl.
   CPC ......... *H02J 7/0013* (2013.01); *H02J 2310/48* (2020.01)

(58) Field of Classification Search
   USPC ........................................................ 320/109
   See application file for complete search history.

(56) References Cited

U.S. PATENT DOCUMENTS

| | | | |
|---|---|---|---|
| 3,412,317 A | 11/1968 | Williamson et al. | |
| 5,028,859 A | 7/1991 | Johnson et al. | |
| 5,109,327 A | 4/1992 | Griffin | |
| 5,604,385 A | 2/1997 | David | |
| 6,018,203 A | 1/2000 | David et al. | |
| 7,554,292 B2 | 6/2009 | Veselic | |
| 8,509,976 B2 | 8/2013 | Kempton | |
| 2009/0189456 A1* | 7/2009 | Skutt | H02J 3/381 307/87 |
| 2009/0230920 A1 | 9/2009 | Veselic | |
| 2011/0202192 A1 | 8/2011 | Kempton | |
| 2012/0074779 A1 | 3/2012 | Black et al. | |
| 2012/0175951 A1 | 7/2012 | Pamulaparthy et al. | |
| 2012/0316691 A1 | 12/2012 | Boardman et al. | |
| 2013/0200862 A1 | 8/2013 | Steinberg | |
| 2014/0021917 A1* | 1/2014 | Paupert | B60L 53/68 320/109 |
| 2014/0058575 A1 | 2/2014 | Ashworth et al. | |
| 2015/0375627 A1* | 12/2015 | Weber | B60L 3/0069 320/109 |

FOREIGN PATENT DOCUMENTS

| | | |
|---|---|---|
| EP | 3184352 A1 | 6/2017 |
| WO | 2015161862 A1 | 10/2015 |
| WO | 2020178341 A1 | 9/2020 |
| WO | WO-2020178341 A1 * | 9/2020 ............. B60L 53/11 |

OTHER PUBLICATIONS

SAE J1772—SAE Electric Vehicle Conductive Charge Coupler, Revised Aug. 2001, Prepared by the SAE EV Charging Systems Committee.

* cited by examiner

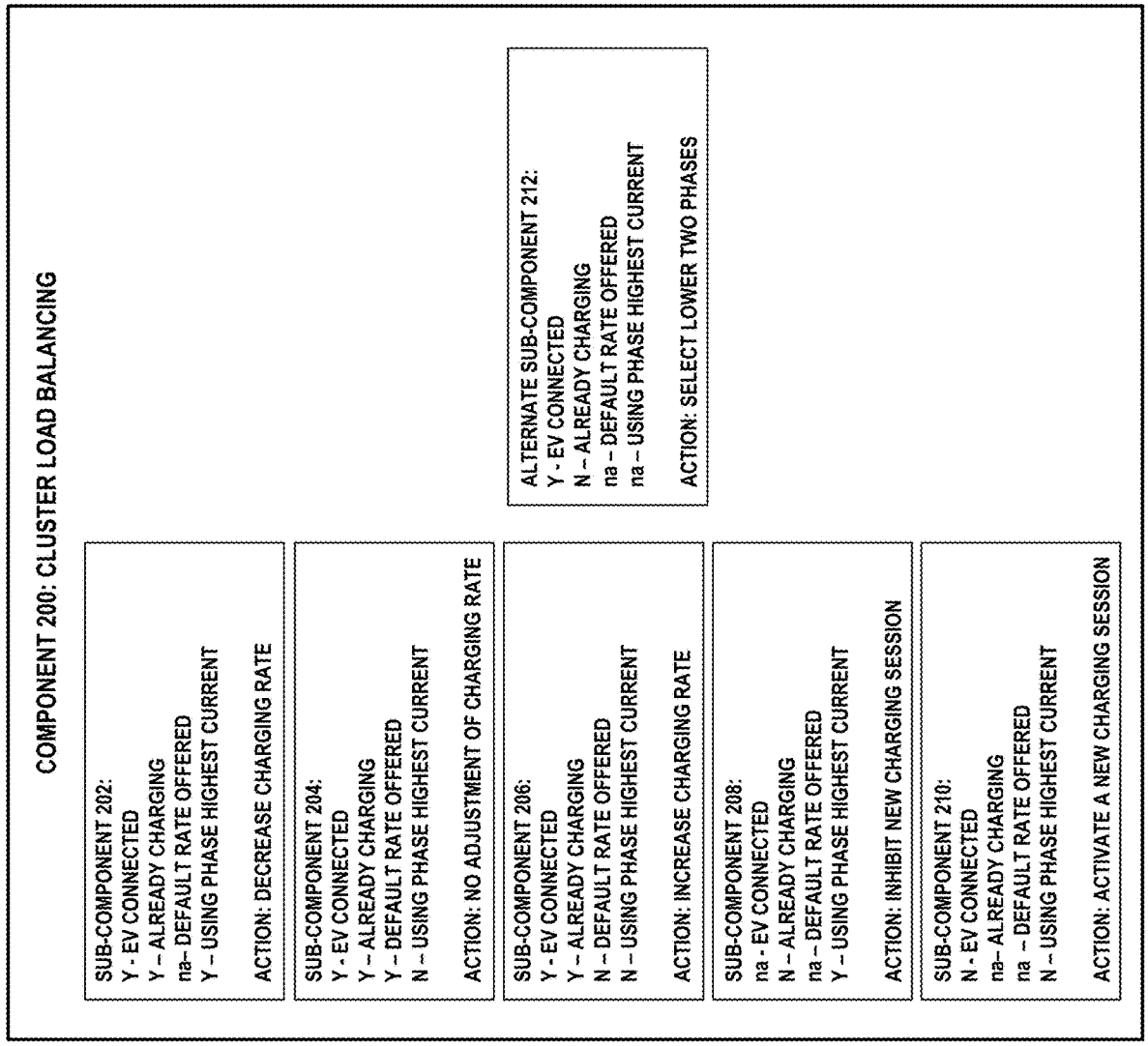

AC EVSE CLUSTER LOAD BALANCING SYSTEM

PRIORITY

The present U.S. patent application is a continuation of U.S. patent application Ser. No. 16/516,580, filed Jul. 19, 2019, and claims priority under 35 U.S.C. § 120. The disclosure of the above priority application is incorporated herein, in its entirety, by reference.

TECHNICAL FIELD

The present disclosure relates to power distribution systems, and more particularly, to an alternating current (AC) Electric Vehicle Service Equipment (EVSE) cluster load balancing system.

BACKGROUND

In opportunity charging installations with multiple AC EVSEs, also known as EVSE clusters, such as shopping centers and work places, it is common for each EVSE to be connected to two phases from a three-phase power distribution system. A problem may exist for installations with EVSE clusters where the cluster places an unbalanced load demand on the three-phase power distribution system. For example, if all of the EVSEs currently charging electric vehicles (EVs) are connected to either phases A & B, or phases A & C, the load on phase A will equal the sum of all currently charging EVSEs while phases B and C will see lower loads than phase A.

When designing an EVSE installation, the specifying engineer may determine the capacity for the electrical distribution system based on the potential EVSE load. In general, the specifying engineer may design an EVSE cluster installation with sufficient capacity for providing power at maximum load simultaneously to all EVSEs in the cluster. Despite operating within the maximum design capacity of the system, the potential for a significant unbalanced load may reduce the efficiency of three-phase transformers, potentially reducing the actual total system capacity. An unbalanced load condition may induce undesirable power quality characteristics that may impair the performance of other loads on the power distribution system. Moreover, an unbalanced load condition may even result in power factor penalties being applied according to an energy contract with the power utility.

SUMMARY

In accordance with one embodiment described herein, an EVSE charging station is connected to a three-phase power source. The EVSE receives a signal from a three-phase current monitor identifying which phase has the highest current of the three phases of the power source. The EVSE determines whether it is connected to an EV's onboard charging device, whether the EVSE is already charging the EV, whether the EVSE has offered to the EV's onboard charging device a default charging rate, and whether the EVSE is using the phase that has the highest current. The EV's onboard charging device includes an onboard charger and an onboard charge controller.

If the EVSE determines that it is connected to an EV's onboard charging device, determines that it is already charging the connected EV, and determines that the EVSE is using the phase that has the highest current, then the EVSE transmits a control signal to the EV's onboard charging device reducing the offered charging rate of the current that the EV is consuming from the EVSE. The control signal is an advertised capability of the EVSE that the EV charging controller is obliged to respect.

If the EVSE determines that it is connected to an EV's onboard charging device and determines that it is already charging the connected EV, but determines that the EVSE is not using the phase that has a highest current, then the EVSE determines whether it has offered to the EV's onboard charging device a charging rate that is less than a default charging rate.

If the EVSE determines that it has offered less than the default charging rate to the EV's onboard charging device, then the EVSE transmits a control signal to the EV's onboard charging device to increase the charging rate of the current that the EV is consuming from the EVSE.

If the EVSE determines that it has offered the default charging rate to the EV's onboard charging device, then the EVSE maintains the control signal unchanged, in other words it does not modify the control signal to offer an increased charging rate to the EV's onboard charging device to adjust the charging rate of the current that the EV is consuming from the EVSE.

If the EVSE determines that it is not connected to an EV's onboard charging device and determines that the EVSE is using the phase that has a highest current, then the EVSE inhibits an EV that later connects to the EVSE, from receiving charging current from the EVSE.

If the EVSE determines that it is not connected to an EV's onboard charging device and determines that the EVSE does not use the phase that has a highest current, then the EVSE will activate a new charging session with an EV that later connects to the EVSE.

In another embodiment, if the EVSE determines that it is connected to an EV's onboard charging device, but determines that the EVSE is not already charging the EV, then selects one of the other phases than the phase having a highest current, and the EVSE charges the EV using the selected one of the other phases. The EVSE will not select the phase with the highest current to initiate a new charging session.

In accordance with one embodiment described herein, a method, comprises:
  receiving, by a charging station, a signal identifying at least one phase having a highest flow of current from among a three-phase power source coupled to the charging station;
  determining, by the charging station, whether a charging device is connected to the at least one phase based on the signal; and
  transmitting, by the charging station, a control signal to adjust a charging rate of the charging device to consume the current from the three-phase power source based on the determination.

In accordance with another embodiment described herein, a system, comprises:
  a memory; and
  a processing logic, operatively coupled to the memory, to:
  receive a signal identifying at least one phase having a highest flow of current from among a three-phase power source coupled to a charging station;
  responsive to detecting that the charging station is connected to a charging device, select one of the phases other than the at least one phase having a highest flow of current based on the signal; and cause the charging station to charge to the charging device based on the selection of one of the phases.

The resulting method, apparatus, system, and computer program product resolve the problem of unbalanced loads in an EVSE cluster of multiple EVSE charging stations. A signal is provided to the EVSEs identifying which phase of the three-phase power source has the highest current. When one of the EVSEs in the cluster determines whether it is connected to an EV's onboard charging device, determines whether it is already charging the connected EV, and determines whether the EVSE is using the phase that has the highest current, then the EVSE may transmit a cluster load balancing control pilot signal to the EV's onboard charging device to adjust the charging rate of the current that the EV is consuming from the EVSE, based on the determinations.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 2 is an example diagram of a cluster load balancing component in the memory of the EVSE of FIG. 1 according to an embodiment of the disclosure.

DETAILED DESCRIPTION

EVSE Charging Station

Figure 1:
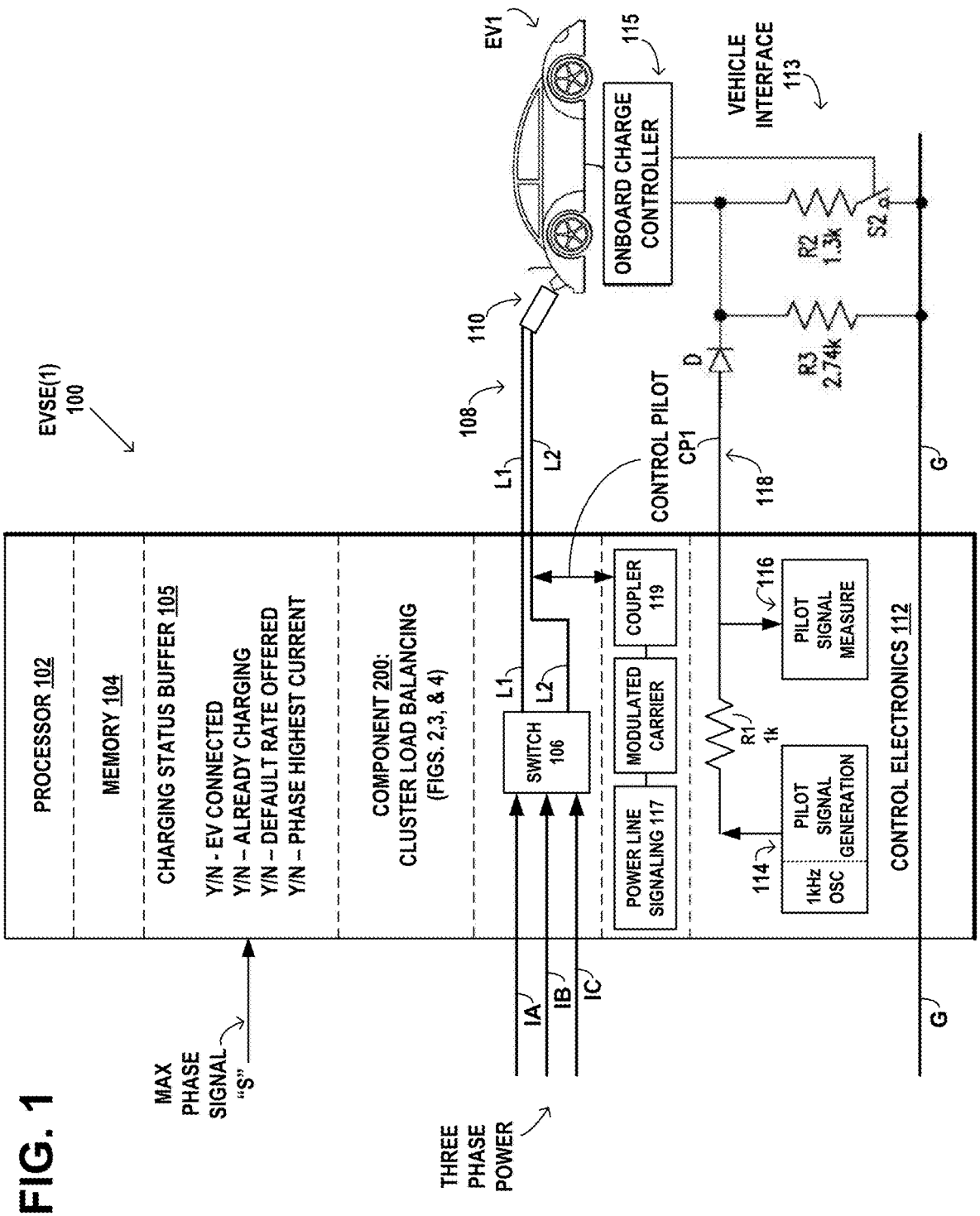
FIG. 1 is an example functional block diagram of an EVSE charging station according to an embodiment of the disclosure

FIG. 1 is an example functional block diagram of an EVSE charging station 100 that receives a signal "S" identifying which phase of a three-phase power source has the highest current. EVSE charging station 100 communicates with the onboard charging device in the example EV labeled EV1 using a control pilot signal CP1 as a control signal. The EV's onboard charging device includes an onboard charger and an onboard charge controller 115. Two example embodiments are shown for communicating the control pilot signal CP1 between the EVSE 100 and the onboard charging device of EV1.

One example embodiment may communicate the control pilot signal CP1 as the control signal over a separate control pilot line 118 to the onboard charge controller 115 of the onboard charging device, using the SAE J1772 "Electric Vehicle and Plug In Hybrid Electric Vehicle Conductive Charge Coupler" standard, published by the Society of Automotive Engineers (SAE) in January 2010.

A second example embodiment may communicate the control pilot signal CP1 as the control signal over the power conductors L1 and L2 to the onboard charging device, using power line signaling 117 with a modulated carrier coupled via the coupler 119 to the power conductors L1 and L2. The IEEE 1901 Broadband-Over-Power-Lines (BPL) standard may be used to communicate the SAE J1772 control pilot signal CP1 as a digital signal modulated on a high frequency carrier signal over the power conductors L1 and L2.

Another alternate embodiment may communicate the control pilot signal CP1 as the control signal over a wireless data link between the EVSE and the EV. The wireless data link may be used to control the EV's onboard charging device, in conjunction with contactless wireless power transfer using power-receiving coils on the EV to capture a magnetic field generated by power transmission coils connected to the power conductors of the EVSE. For example the SAE J2954 Wireless Power Transfer for Light-Duty Plug-in/Electric Vehicles and Alignment Methodology J2954 standard, published Apr. 23, 2019, establishes national standards on which automotive wireless charging systems may be based. In an example embodiment, a wireless transceiver (not shown) in the EVSE 100, may communicate the SAE J1772 control pilot signal CP1 as a digital signal modulated on a high frequency carrier signal over the wireless medium with a wireless transceiver (not shown) coupled to the EV's onboard charging device.

The following description of communicating the control pilot signal CP1 between the EVSE 100 and the onboard charging device of EV1, is directed to the example embodiment that communicates the control pilot signal CP1 as the control signal over the separate control pilot line 118. The example EVSE shown, labeled EVSE(1), may transmit a signal as a control pilot signal CP1 on line 118 to a vehicle interface 113 connected to the onboard charge controller 115 of the example EV labeled EV1. The signal may adjust the charging rate of the current that the EV is consuming from the EVSE, based on determinations made by an example cluster load balancing component 200 in the EVSE, shown in greater detail in FIG. 2.

Figure 3:
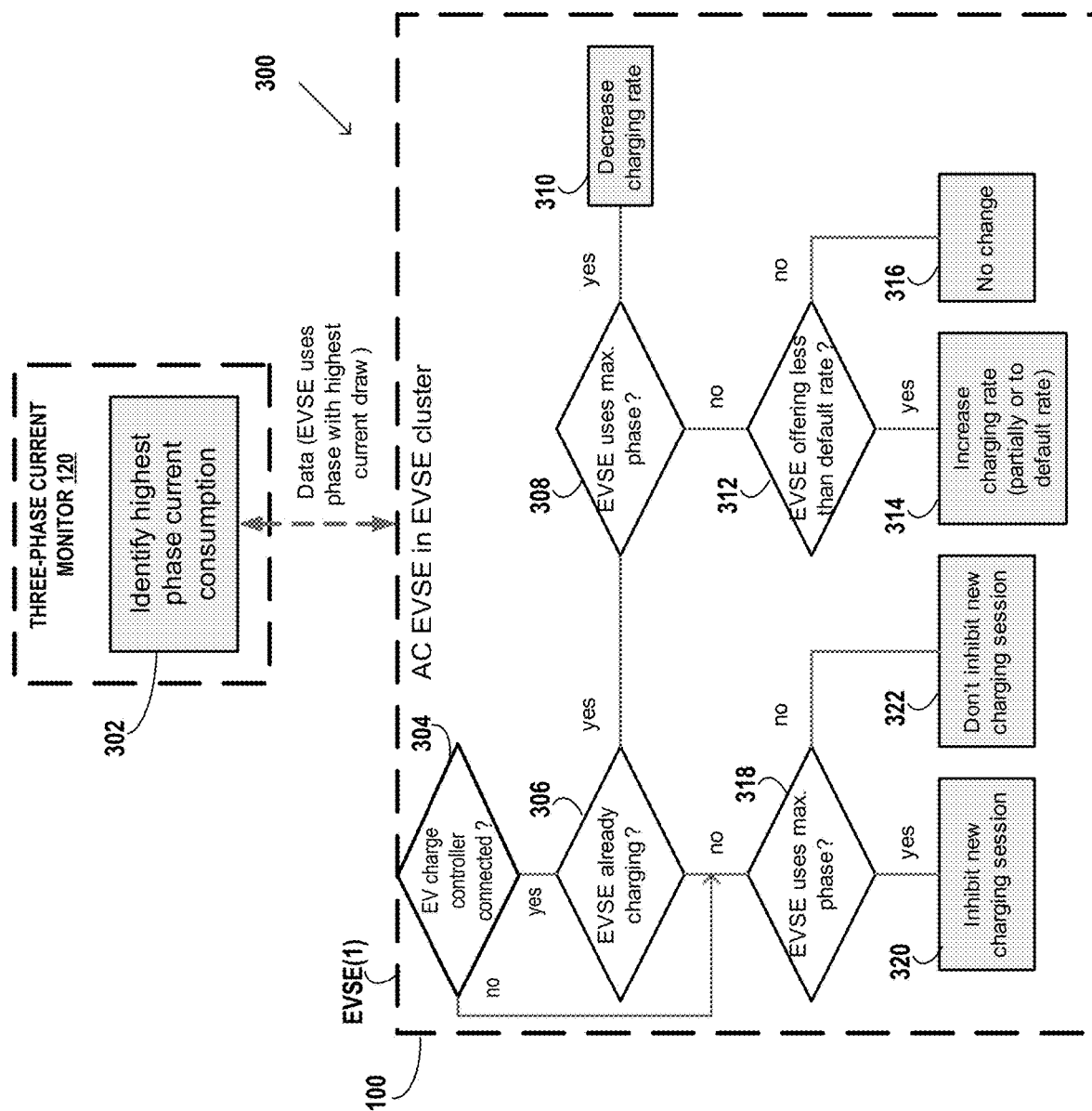
FIG. 3 is an example flow diagram of a method according to an embodiment of the disclosure.
Figure 4:
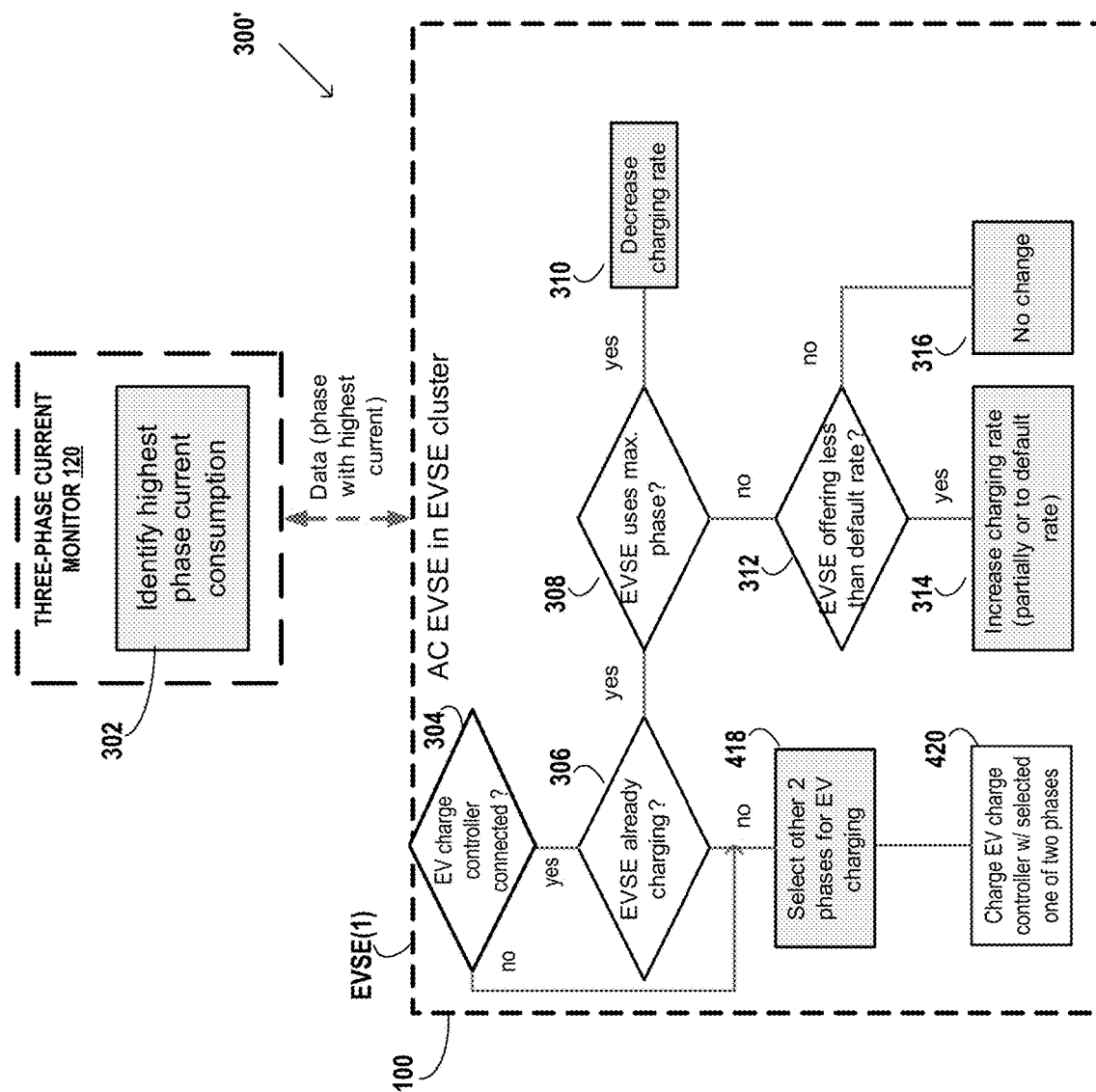
FIG. 4 is an example flow diagram of another method according to an embodiment of the disclosure

The example EVSE 100 may include a processor 102 and associated memory 104 that includes computer program instructions executable by the processor 102, which produce a machine that can carry out the functions of the cluster load balancing component 200 of FIG. 2 and the methods represented in the flow diagrams of FIGS. 3 and 4.

The example EVSE 100 may include a charging status buffer 105 that stores example binary values "Y" (yes) or "N" (no) relating to the present conditions for charging by the EVSE. For the example EVSE shown, labeled EVSE(1), example binary values relating to the present conditions for charging are as shown in the following Table 1:

TABLE 1

| Present Condition | Value |
| --- | --- |
| EV Connected | Y(yes)/N(no) |
| Already Charging | Y(yes)/N(no) |
| Default Rate Offered | Y(yes)/N(no) |
| Phase Highest Current | Y(yes)/N(no) |

The example EVSE 100 may include an example cluster load balancing component 200, shown in greater detail in FIG. 2. The cluster load balancing component 200 may access the values in the charging status buffer 105 relating to the present conditions for charging by the EVSE. The cluster load balancing component 200 analyzes the values "EV Connected", "Already Charging", "Default Rate Offered", and "Phase Highest Current", based on the overall method described in the example flow diagrams 300 and 300' of FIGS. 3 and 4. The cluster load balancing component 200 provides the cluster load balancing signals s to the onboard charging device of a connected EV, as control pilot signals. The cluster load balancing component includes sub-components to cause adjusting the charging rate of the current that the connected EV is consuming from the EVSE, based on determining whether the EVSE is connected to an EV's onboard charging device, whether the EVSE is already charging the connected EV, whether it has offered to the EV's onboard charging device a default charging rate, and whether the EVSE is using the phase that has the highest current. The cluster load balancing component and sub-components may take the form of an entirely hardware embodiment, an entirely software embodiment (including firmware, resident software, micro-code, etc.) or an embodiment combining software and hardware aspects.

The example EVSE 100 includes a switch 106 that may select which pair of the three phases A, B, and C from the three-phase power source, are output on the two power conductors L1 and L2 of the cordset 108 to the EV. The EVSE 100 may provide 208 to 240 volt AC, single phase power on the power conductors L1 and L2 and ground conductor G of the EVSE cordset 108.

The example EVSE 100 may include the power line signaling unit 117 that modulates a carrier signal that is coupled via the coupler 119 to communicate the control pilot signal CP1 over the power conductors L1 and L2. The IEEE 1901 Broadband-Over-Power-Lines (BPL) standard may be used to communicate the SAE J1772 control pilot signal CP1 modulated on a high frequency carrier signal over the power conductors L1 and L2.

The example EVSE 100 may include a control electronics unit 112 that outputs via the control pilot line 118 the control pilot signal CP1 as a 1 kHz square wave signal generated by the pilot signal generation unit 114 to define the state of the charging transaction. The pilot signal measure unit 116 receives an indication via the control pilot line 118 representing a connection state of the charging handle 110.

The example EVSE 100 is connected by the cordset 108 comprising the power conductors L1 and L2, ground conductor G, and control pilot line 118 and the charging handle 110, to a power inlet of the EV1, for charging the EV's rechargeable batteries. The EVSE's cordset 108 and charging handle 110 provide AC charging current to the EV on power conductors L1 and L2 and ground conductor G. The AC is converted to regulated direct current by the charger onboard the EV, for replenishing the charge of the rechargeable batteries. The charger onboard the EV is controlled by the onboard charge controller 115. The EVSE transmits the control pilot signal CP1 on control pilot line 118 of the cordset 108 and charging handle 110. The control pilot signal CP1 functions to verify that an EV is present and connected, permits energization/de-energization of the charging current, and provides a maximum available current rating to the EV. The rechargeable batteries power at least one electric motor to propel the EV, based on driver input to the EV's accelerator pedal.

The EVSE 100 may operate, for example, based on the SAE J1772 standard, to provide 208 to 240 volt AC, single phase power for a maximum continuous current of 32 Amperes, on the power conductors L1 and L2 and ground conductor G of the EVSE cordset 108. The SAE J1772 standard specifies the control pilot signal CP1 functions, as discussed below, on the control pilot line 118 of the EVSE cordset 108.

The control pilot signal specified in the example SAE J1772 standard is a 1 kHz square wave signal in the range of +12 and −12 volts provided by the pilot signal generation unit 114 in the control electronics 112. The control pilot signal uses its voltage to define the state of the charging transaction. If the 1 kHz square wave signal positive voltage is +12 volts, this indicates State A, that an EV is not connected. If the 1 kHz square wave signal positive voltage is +9 volts and the minus voltage is −12 volts, this indicates State B that an EV is connected, but is not ready to receive a charge. The SAE J1772 standard specifies that the 1 kHz square wave signal positive voltage of +6 volts and the minus voltage is −12 volts, indicates State C, that the EV is ready to accept the charge. The EV performs this signaling by using the resistors R2 and R3 and the diode D in the vehicle interface 113, to condition the positive voltage as +6 volts and the minus voltage as −12 volts on the control pilot line 118, thereby signaling State C to the EVSE, that the charging handle 110 is connected and an EV is ready to receive the charge.

When an EV connects to the charging handle 110, the EV issues a State B signal over a control pilot signal line 118, indicating that the EV is connected, but is not ready to accept energy. The EVSE learns of the presence of an EV connected to its charging handle 110, by means of the pilot signal measurement circuit 116 in the control electronics 112 in the EVSE. The pilot signal measurement circuit 116 is connected via the control pilot line 118 to the charging handle 110.

The control pilot signal CP1 specified in the example SAE J1772 standard is a pulse width modulated (PWM) square wave. The duty cycle or ratio of the high state to the low state of the square wave is set by the EVSE, to represent the maximum available current on the EVSE power conductors L1 and L2. The EVSE sets the duty cycle of the control pilot signal, which represents the offered charging rate. When an EV is directly connected by the charging handle and cordset to the EVSE 100, the offered charging rate is made to the EV and the EV must comply with the settings required by the EVSE for the specified duty cycle. Example duty cycles and offered charging rates specified in SAE J1772, are shown in Table 2:

TABLE 2

| Amperes | Duty Cycle |
|---|---|
| 6 A | 10% |
| 12 A | 20% |
| 18 A | 30% |
| 24 A | 40% |
| 30 A | 50% |

The EVSE signals to the EV over the control pilot line 118, indicating the amount of the maximum available or default charging rate. The pilot signal generation circuit 114 coupled to the control pilot line 118, transmits respective charging rate offer indications via the control pilot line 118, representing the determined available charging rate to be offered to the EV for charging.

For example, if the EVSE has a maximum available current of 24 Amperes, it would set the duty cycle of the control pilot signal at 40%. The EVSE may then determine that the available charging rate to be offered to the EV is the full or default available charging rate of 24 Amperes. Thus, the pilot signal generation circuit 114 transmits a charging rate offer indication of 24 Amperes, by setting the duty cycle of the control pilot signal at 40% on the control pilot line 118.

The EV then responds by issuing a State C signal over a control pilot signal line 118, indicating that the EV is ready to accept energy. The EVSE then proceeds to deliver the charging current to the EV over its power conductors L1 and L2, at the offered charging rate.

According to the example SAE J1772 standard interface, when connected to an EV, the EVSE control electronics 112 generates a square wave control pilot signal of +/−12V that is applied to the control pilot line 118 at the pilot signal generation output of the control electronics 112. The EVSE measures the signal formed by a voltage divider circuit, from the pilot signal generation output, through R1, D, R3, and R2 and S2, when S2 is closed, as controlled by the EV's onboard charge controller 115. Measuring the pilot signal formed by the voltage divider allows the EVSE to detect the connection of the vehicle. The EVSE differentiates the EV from other kinds of loads, based on there being a different divider circuit formed by the other kinds of loads during the positive and negative parts of the pilot signal duty cycle, due to the reverse bias of diode D during the negative duty cycle. The EVSE further detects when the EV is ready to accept charge, based on the different voltage dividers formed in the two states of switch S2 being open or closed.

EVSE Cluster

Figure 1A:
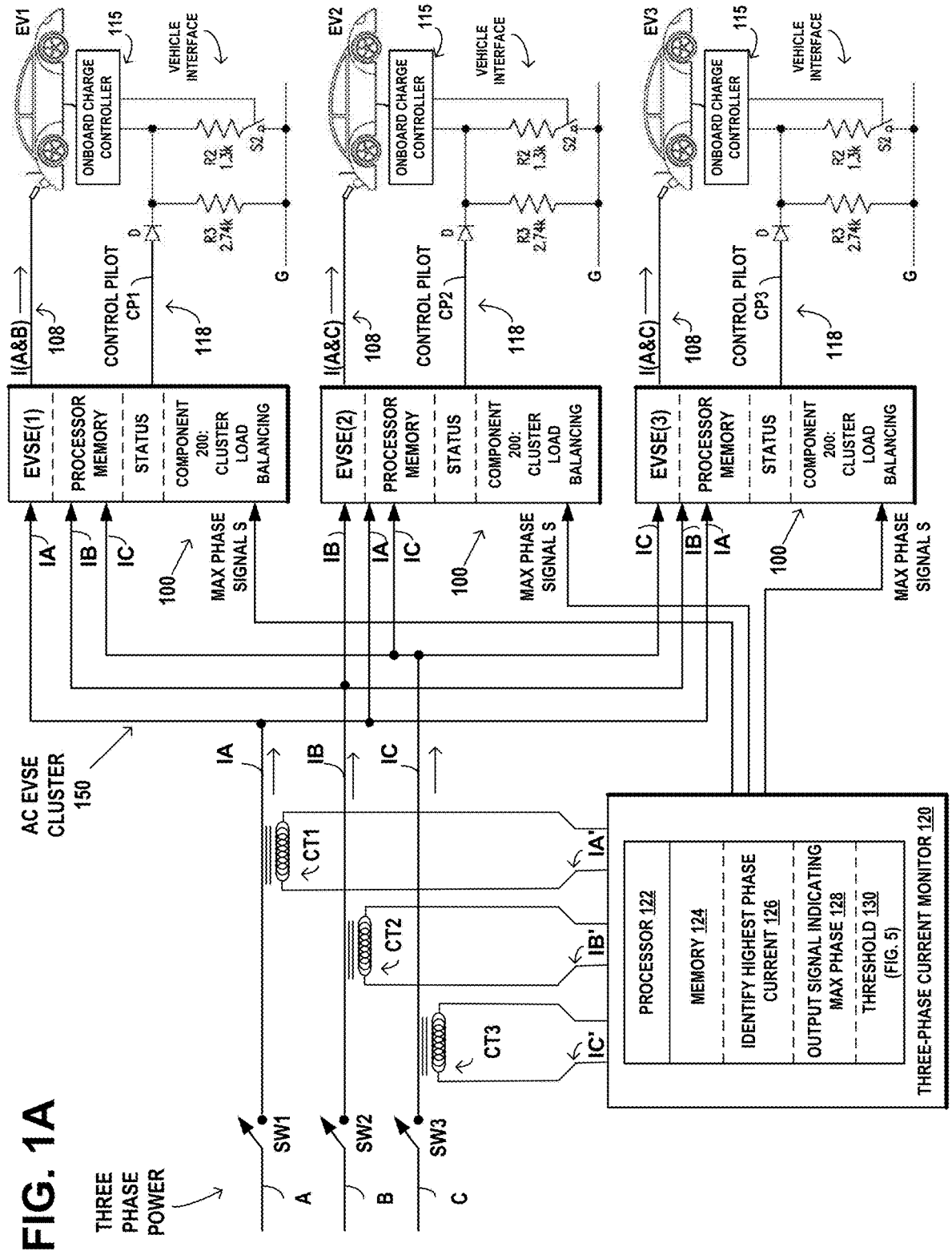
FIG. 1A is an example network diagram according to an embodiment of the disclosure.

FIG. 1A is an example network diagram of an EVSE cluster 150 of three of the EVSE charging stations 100 of FIG. 1: EVSE(1), EVSE(2), and EVSE(3). FIG. 1A shows a three-phase current monitor 120 providing to each of the EVSEs, the max phase signal "S" identifying which phase of the three-phase power source has the highest current. The example three-phase current monitor 120 includes a processor 122 and an associated memory 124 that includes computer program instructions executable by the processor 122, which produce a machine that can carry out the functions of the three-phase current monitor 120 of FIG. 1A and the method represented in the flow diagram of FIG. 5. The three-phase current monitor 120 measures the currents IA, IB, and IC in each respective phase A, B, and C using the respective current transformers CT1, CT2, and CT3 that output proportional secondary currents IA', IB', and IC'.

The three-phase current monitor 120 identifies at 126 the phase with the highest current and outputs at 128 the signal "S" indicating the phase with the highest current or "max phase". The max phase signal "S" may be a single binary bit or two or more binary bits of information. The single bit provides data to each EVSE as to whether that EVSE is connected to the phase with the highest current draw. With the single bit of information, the EVSE does not know specifically which is the maximum phase, A, B, or C, but just that one of its two phases is the phase with the highest current draw. Two or more bits data provided to each EVSE identifies which of the three phases has the highest current. The tradeoff is that with the single bit of information, the EVSE may be simpler, but the three-phase current monitor 120 has to know which phases are connected to each EVSE in order to determine which EVSE receives this specific bit. Two or more bits of information allows more flexibility for the EVSE to potentially initiate charging from the other two phases, use more of the available capacity of the system, and provide the opportunity to offer a higher charging rate to charge the vehicle faster.

Figure 5:
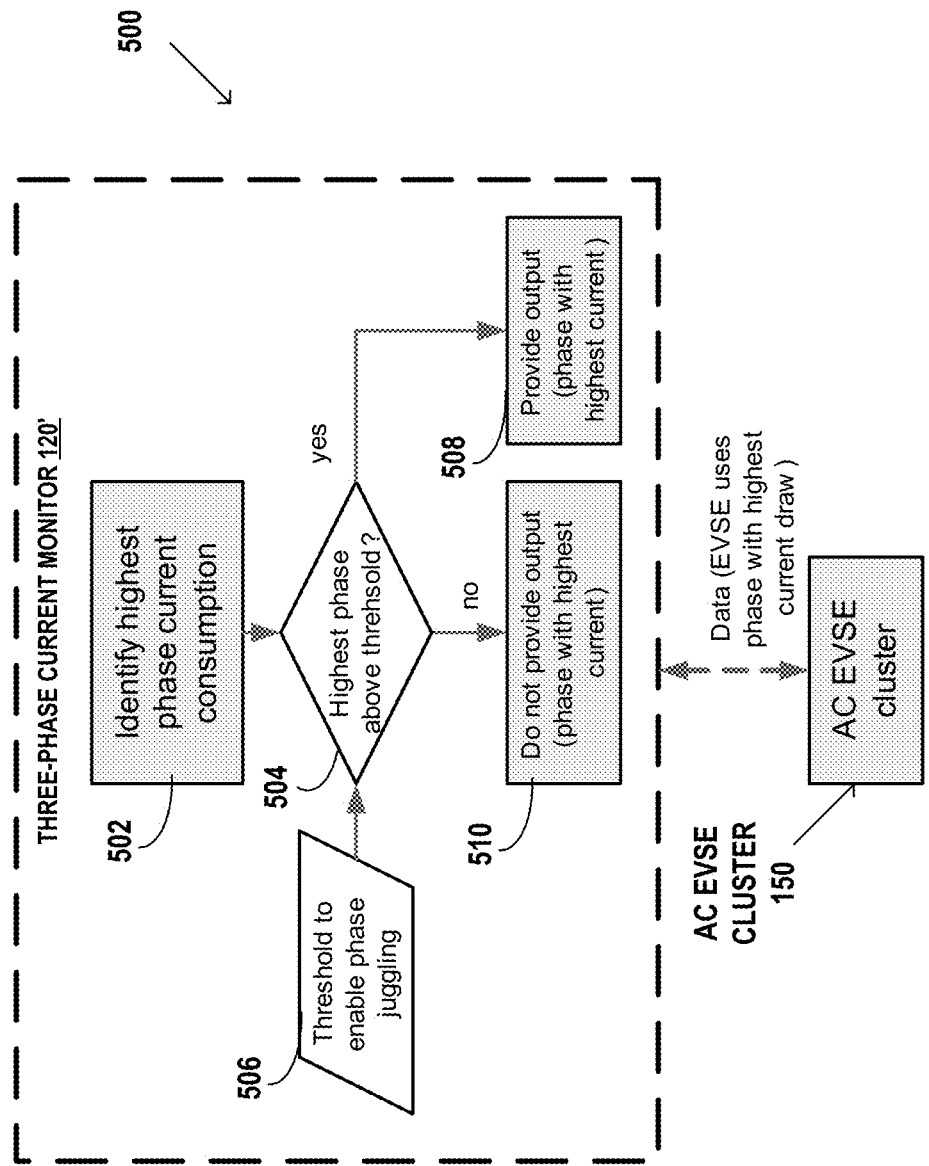
FIG. 5 is an example flow diagram of yet another method according to an embodiment of the disclosure Identical reference numerals have been used, where possible, to designate identical elements that are common to the figures. However, elements disclosed in one embodiment may be beneficially utilized on other embodiments without specific recitation.

In some example embodiments, the max phase signal "S" is immediately transmitted to all of the EVSEs in the EVSE cluster 150. In other example embodiments, the measured value of the highest current is compared with a threshold value 130 and the max phase signal "S" is only transmitted to the EVSE cluster 150 when the measured value of the highest current is greater than the threshold 130. FIG. 5 is an example flow diagram of a method performed by the three-phase current monitor 120 with the threshold value 130. This allows the system capacity to be maximized before any corrective action is taken to balance the system. For example, if the distribution system is able to tolerate the unbalance without performance degradation when the current draw is below a nominal threshold.

In an example charging session shown in FIG. 1A, EVSE(1) provides charging current I(A&B) for phases A and B to the vehicle EV1. EVSE(2) provides charging current I(A&C) for phases A and C to the vehicle EV2. EVSE(3) provides charging current I(A&C) for phases A and C to the vehicle EV3. The three-phase current monitor 120 identifies the phase A as having the highest current and outputs the signal "S" indicating the phase A has the highest current or "max phase".

One of the EVSEs in the cluster 150, for example EVSE (1), may access the values in the charging status buffer 105 relating to the present conditions for charging by EVSE(1), as shown in the above Table 1. For example, the present conditions for charging by EVSE(1) may be: EV Connected=Y; Already Charging=Y; Default Rate Offered=Y; and Phase Highest Current=Y.

In response, the example cluster load balancing component 200 may specify the action of decreasing the charging rate of the current that the EV1 is consuming from the EVSE(1), by causing a cluster load balancing signal to be transmitted to the onboard charge controller 115 of the charging device in the connected EV1. EVSE(1) transmits the signal as a control pilot signal on the control pilot line 118 to the EV's onboard charge controller 115 to decrease the charging rate of the current that the EV1 is consuming from the EVSE(1). The EVSE reduces the offered charging rate of the current that the EV is consuming from the EVSE. The control pilot signal is an advertised capability of the EVSE that the EV charging controller is obliged to respect. To avoid system instability or oscillation problems, each EVSE may gradually make adjustments to the charging offers by making multiple small adjustments over time. The adjustments may be at fixed or random intervals. The resulting reduction in the charging rate by EVSE(1), helps reduce the unbalance of currents in the three phases.

Cluster Load Balancing Component

An example cluster load balancing component 200 shown in greater detail in FIG. 2, provides the cluster load balancing signals s to the onboard charge controller 115 of the connected EV, to adjust the charging rate of the current that the connected EV is consuming from the EVSE. The example cluster load balancing component 200 includes six sub-components 202, 204, 206, 208, 210, and 212, which determine whether the EVSE is connected to an EV's onboard charge controller, whether the EVSE is already charging the connected EV, whether the EVSE has offered to the EV's onboard charge controller a default charging rate, and whether the EVSE is using the phase that has the highest current.

Referring to the example flow diagram 300 of FIG. 3, it is seen that starting with the common block 302 (receiving the identity of the phase having the highest current), there are five resulting actions: block 310 (decreasing charging rate), block 316 (making no change), block 314 (increasing charging rate), block 320 (inhibiting a new charging session), and block 322 (not inhibiting or activating a new charging session). Each of these five action blocks lies at the end of one of five unique logic paths through the example flow diagram 300 of FIG. 3.

Referring to the example flow diagram 300' of FIG. 4, it is seen that starting with the same common block 302, the resulting action block 418 (selecting other two phases for EV charging), lies at the end of a sixth unique logic path thru the example flow diagram 300' of FIG. 4.

Each of these six logic paths is based on a respective unique pattern of the four binary values "Y" (yes) or "N" (no) related to present charging conditions ("EV Connected", "Already Charging", "Default Rate Offered", and "Phase Highest Current"), accessed from the charging status buffer 105. Each logic path is defined by whether the EVSE is connected to an EV's onboard charge controller, whether the EVSE is already charging the connected EV, whether the EVSE has offered to the EV's onboard charge controller a default charging rate, and whether the EVSE is using the phase that has the highest current.

The example cluster load balancing component 200 in the EVSE 100 uses a simple pattern matching method to classify the present conditions for charging, "EV Connected", "Already Charging", "Default Rate Offered", and "Phase Highest Current", accessed from the charging status buffer 105. For a given charging session, the present conditions for charging are matched with one of six reference patterns of binary values "Y" (yes) or "N" (no) directing the six logic paths through the example flow diagrams 300 and 300' of FIGS. 3 and 4. For a given charging session, the action block at the end of a logic path for a matched pattern of present conditions, is the action that is transmitted by the EVSE as a signal to the EV to adjust the charging rate. When the charging status buffer 105 indicates a change in the pattern of the present conditions for charging, the example cluster load balancing component 200 executes the simple pattern matching method to determine if a rebalancing of the phases is necessary.

For example, when the vehicle EV3 completes its charging at the EVSE(3) in FIG. 1A, the current draw for phases A and C will be reduced, which may cause a change in the identity of the phase with the highest current. The three-phase current monitor 120 will detect this change and transmit a new max phase signal "S" to the EVSE cluster 150, including the EVSE(1), indicating the change in the identity of the phase with the highest current. The charging status buffer 105 in EVSE(1) will indicate the change in the identity of the phase with the highest current. The example cluster load balancing component 200 in EVSE(1) accesses the charging status buffer 105 and executes the simple pattern matching method to determine if a rebalancing of the phases is necessary.

Each sub-component 202, 204, 206, 208, 210, and 212 corresponds to a respective one of the six unique logic paths through the example flow diagrams 300 and 300' of FIGS. 3 and 4, each sub-component corresponds to a respective unique pattern of the four present conditions for charging, and each sub-component corresponds to a respective resulting action block.

The example cluster load balancing component 200 may compare the accessed present values from charging status buffer 105 with the reference binary values in each of the several sub-components 202, 204, 206, 208, 210, and 212 shown in FIG. 2. For the example EVSE(1), the accessed present values may be matched with the reference binary values in sub-component 202 of FIG. 2. The symbol "na" indicates that a "Y" (yes) or "N" (no) binary value is not meaningful for the condition, such as "ALREADY CHARGING" would not be meaningful if the EV were not connected. The sub-component 202 is shown in the following Table 3:

TABLE 3

| SUB-COMPONENT 202: |
|---|
| Y - EV CONNECTED |
| Y - ALREADY CHARGING |
| na - DEFAULT RATE OFFERED |
| Y - USING PHASE HIGHEST CURRENT |
| ACTION: DECREASE CHARGING RATE |

In the example shown in FIG. 1A, based on the present values accessed from the charging status buffer 105, the example sub-component 202 of FIG. 2 determines that the EVSE(1) is connected to an EV's onboard charge controller 115 of the charging device of EV1. The sub-component 202 further determines that the EVSE(1) is already charging the connected EV1. The sub-component 202 further determines that the EVSE(1) is using the phase A that has the highest current. In other words, the EVSE has determined that the charging device of EV1 is connected to the phase A that has the highest current, based on the max phase signal "S".

The example sub-component 202 of the cluster load balancing component 200 of FIG. 2, shown above in Table 3, is an embodiment of the unique logic path of the sequence of blocks 302, 304, 306, 308, and 310 in the example overall method represented by the flow diagram of FIG. 3, as follows:

Block 302: receiving by the EVSE the a signal identifying at least one phase having a highest flow of current from among a three-phase power source coupled to the EVSE;

Block 304: determining that the EVSE is connected to an EV's onboard charge controller;

Block 306: determining that the EVSE is already charging the EV;

Block 308: determining that the EVSE is using the phase that has the highest current; and Block 310: transmitting a signal to the EV's onboard charge controller to decrease the charging rate of the EV to consume the current from the three-phase power source based on the determination.

In response, the example sub-component 202 may specify the action of decreasing the charging rate of the current that the EV1 is consuming from the EVSE(1), by causing a cluster load balancing signal to be transmitted to the onboard charge controller 115 of the connected EV. EVSE(1) may transmit the signal as a control pilot signal on the control pilot line 118 to the EV's onboard charge controller 115 to decrease the charging rate of the current that the EV1 is consuming from the EVSE(1). The resulting reduction in the charging rate by EVSE(1), helps reduce the unbalance of currents in the three phases.

In another example, the accessed present values may be matched with the reference binary values the sub-component 204 of the cluster load balancing component 200 of FIG. 2, as shown in the following Table 4:

TABLE 4

| SUB-COMPONENT 204: |
|---|
| Y - EV CONNECTED |
| Y - ALREADY CHARGING |

TABLE 4-continued

SUB-COMPONENT 204:

Y - DEFAULT RATE OFFERED
N - USING PHASE HIGHEST CURRENT
ACTION: NO ADJUSTMENT OF CHARGING RATE

For example, the sub-component 204 of the cluster load balancing component 200 of FIG. 2, shown above in Table 4, is an embodiment of the unique logic path of the sequence of blocks 302, 304, 306, 308, 312, and 316 in the example overall method represented by the flow diagram of FIG. 3, as follows:
- Block 302: receiving by the EVSE the a signal identifying at least one phase having a highest flow of current from among a three-phase power source coupled to the EVSE;
- Block 304: determining that the EVSE is connected to an EV's onboard charge controller;
- Block 306: determining that the EVSE is already charging the EV;
- Block 308: determining that the EVSE is not using the phase that has the highest current;
- Block 312: determining that the EVSE offers a default charging rate to the EV; and
- Block 316: making no adjustment to the charging rate of the EV to consume the current from the three-phase power source based on the determination. The EVSE maintains the control pilot signal unchanged to not adjust the charging rate of the charging device to consume the current from the three-phase power source based on the determination.

In another example, the accessed present values may be matched with the reference binary values the sub-component 206 of the cluster load balancing component 200 of FIG. 2, as shown in the following Table 5:

TABLE 5

SUB-COMPONENT 206:

Y - EV CONNECTED
Y - ALREADY CHARGING
N - DEFAULT RATE OFFERED
N - USING PHASE HIGHEST CURRENT
ACTION: INCREASE CHARGING RATE

For example, the sub-component 206 of the cluster load balancing component 200 of FIG. 2, shown above in Table 5, is an embodiment of the unique logic path of the sequence of blocks 302, 304, 306, 308, 312, and 314 in the example overall method represented by the flow diagram of FIG. 3, as follows:
- Block 302: receiving by the EVSE the a signal identifying at least one phase having a highest flow of current from among a three-phase power source coupled to the EVSE;
- Block 304: determining that the EVSE is connected to an EV's onboard charge controller;
- Block 306: determining that the EVSE is already charging the EV;
- Block 308: determining that the EVSE is not using the phase that has the highest current;
- Block 312: determining that the EVSE offers less than a default charging rate to the EV; and
- Block 314: transmitting a signal to the EV's onboard charge controller to increase the charging rate (partially or to the default rate) of the EV to consume the current from the three-phase power source based on the determination.

In another example, the accessed present values may be matched with the reference binary values the sub-component 208 of the cluster load balancing component 200 of FIG. 2, as shown in the following Table 6:

TABLE 6

SUB-COMPONENT 208:

na - EV CONNECTED
N - ALREADY CHARGING
na - DEFAULT RATE OFFERED
Y - USING PHASE HIGHEST CURRENT
ACTION: INHIBIT NEW CHARGING SESSION

For example, the sub-component 208 of the cluster load balancing component 200 of FIG. 2, shown above in Table 6, is an embodiment of the unique logic path of the sequence of blocks 302, 304, 306, 318, and 320 in the example overall method represented by the flow diagram of FIG. 3. The action "inhibit new session" is dependent on not having a currently active charging session. The blocks in the flow diagram of FIG. 3, are as follows:
- Block 302: receiving by the EVSE the a signal identifying at least one phase having a highest flow of current from among a three-phase power source coupled to the EVSE;
- Block 304: determining that the EVSE is not connected to an EV's onboard charge controller;
- Block 318: determining that the EVSE is using the phase that has the highest current; and
- Block 320: transmitting a signal to the EV's onboard charge controller to inhibit the EV from consuming the current from the three-phase power source, based on the determinations.

In another example, the accessed present values may be matched with the reference binary values the sub-component 210 of the cluster load balancing component 200 of FIG. 2, as shown in the following Table 7:

TABLE 7

SUB-COMPONENT 210:

N - EV CONNECTED
na- ALREADY CHARGING
na - DEFAULT RATE OFFERED
N - USING PHASE HIGHEST CURRENT
ACTION: ACTIVATE A NEW SESSION

For example, the sub-component 210 of the cluster load balancing component 200 of FIG. 2, shown above in Table 6, is an embodiment of the unique logic path of the sequence of blocks 302, 304, 318, and 322 in the example overall method represented by the flow diagram of FIG. 3, as follows:
- Block 302: receiving by the EVSE the a signal identifying at least one phase having a highest flow of current from among a three-phase power source coupled to the EVSE;
- Block 304: determining that the EVSE is not connected to an EV's onboard charge controller;
- Block 318: determining that the EVSE is not using the phase that has the highest current; and
- Block 322: activating (not inhibiting) a new charging session with a new EV based on the determination. The EVSE may reset to the default charging rate offer upon beginning a new charging session.

In an embodiment, the accessed present values may be matched with the reference binary values an example sub-component 212 of the cluster load balancing component 200 of FIG. 2, as shown in the following Table 8:

TABLE 8

ALT. SUB-COMPONENT 212:

Y - EV CONNECTED
N - ALREADY CHARGING
na - DEFAULT RATE OFFERED
na - USING PHASE HIGHEST CURRENT
ACTION: SELECT LOWER TWO PHASES

In an embodiment, the sub-component 212 of the cluster load balancing component 200 of FIG. 2, shown above in Table 8, is an embodiment of the unique logic path of the sequence of blocks 302, 304, 306, 418, and 420 in the alternate example overall method represented by the alternate example flow diagram 300' of FIG. 4, as follows:

Block 302: receiving by the EVSE the a signal identifying at least one phase having a highest flow of current from among a three-phase power source coupled to the EVSE;

Block 304: determining that the EVSE is connected to an EV's onboard charge controller;

Block 306: determining that the EVSE is not charging the EV;

Block 418: the EVSE selects the lower two phases for EV charging. The EVSE will most likely be a phase-phase connection. However, for EVSEs that have a phase-neutral connection, the EVSE selects a lower phase for EV charging. The EVSE will not select the phase with the highest current to initiate a new charging session.

Block 420: transmitting a signal to the EV's onboard charge controller to offer a charging rate of the EV.

For a given charging session, the present conditions for charging in the charging status buffer 105 are matched with one of the six reference patterns of binary values in the sub-components 202, 204, 206, 208, 210, and 212, which direct the six logic paths through the example flow diagrams 300 and 300' of FIGS. 3 and 4. For a given charging session, the action block at the end of a logic path for a matched pattern of present conditions, is the action that is transmitted by the EVSE as a signal to the EV to adjust the charging rate. When the charging status buffer 105 indicates a change in the pattern of the present conditions for charging, the example cluster load balancing component 200 executes the simple pattern matching method to determine if a rebalancing of the phases is necessary.

Overall Architecture, Functionality and Operation

FIG. 3 is an example flow diagram of an overall method performed by the cluster load balancing component 200 of FIG. 2, transmitting cluster load balancing signals s by the EVSE to the onboard charging device of a connected EV. The cluster load balancing signals s cause adjusting the charging rate of the current that the connected EV is consuming from the EVSE based on determining whether the EVSE is connected to an EV's onboard charging device, whether the EVSE is already charging the connected EV, whether it has offered to the EV's onboard charging device a default charging rate, and whether the EVSE is using the phase that has the highest current. The overall method maybe implemented as computer program code stored in the memory 104 and executable by the processor 102 in the EVSE 100.

The example sub-component 202 of the cluster load balancing component 200 of FIG. 2, shown above in Table 3, is an embodiment of the sequence of blocks 302, 304, 306, 308, and 310 in the example overall method represented by the flow diagram of FIG. 3.

The sub-component 204 of the cluster load balancing component 200 of FIG. 2, shown above in Table 4, is an embodiment of the sequence of blocks 302, 304, 306, 308, 312, and 316 in the example overall method represented by the flow diagram of FIG. 3.

The sub-component 206 of the cluster load balancing component 200 of FIG. 2, shown above in Table 5, is an embodiment of the sequence of blocks 302, 304, 306, 308, 312, and 316 in the example overall method represented by the flow diagram of FIG. 3.

The sub-component 208 of the cluster load balancing component 200 of FIG. 2, shown above in Table 6, is an embodiment of the sequence of blocks 302, 304, 318, and 320 in the example overall method represented by the flow diagram of FIG. 3.

The sub-component 210 of the cluster load balancing component 200 of FIG. 2, shown above in Table 6, is an embodiment of the sequence of blocks 302, 304, 318, and 322 in the example overall method represented by the flow diagram of FIG. 3.

The example flow diagram of FIG. 3 illustrates an example architecture, functionality and operation of possible implementations of the cluster load balancing component 200 of FIG. 2. Each block in the example flow diagram of FIG. 3 may represent a module, segment or portion of code, which comprises one or more executable instructions for implementing the specified logical functions. In some alternative implementations, the functions noted in the blocks may occur out of the order noted in FIG. 3. For example, two blocks shown in succession may, in fact, be executed substantially concurrently, or the blocks may sometimes be executed in the reverse order, depending upon the functionality involved. Each block of the example flow diagram of FIG. 3, and combinations of blocks in FIG. 3, may be implemented by special purpose hardware-based systems that perform the specified functions or acts, or combinations of special purpose hardware and computer instructions.

FIG. 4 is an example flow diagram of an alternate embodiment of an overall method performed by the cluster load balancing component 200 of FIG. 2, transmitting cluster load balancing signals s. The blocks 302, 304, 306, 308, 310, 312, 314, and 316 of the flow diagram of FIG. 4 are substantially the same as the same numbered blocks in the flow diagram of FIG. 3. In block 418 of FIG. 4, the EVSE 100 selects one of the other two phases than the phase having a highest current, and the EVSE charges the EV using the selected one of the other two phases.

The sub-component 212 of the cluster load balancing component 200 of FIG. 2, shown above in Table 8, is an embodiment of the sequence of blocks 302, 304, 306, 418, and 420 in the alternate example overall method represented by the alternate example flow diagram of FIG. 4. The alternate embodiment method of FIG. 4 may be implemented as computer program code stored in the memory 104 and executable by the processor 102 in the EVSE 100.

FIG. 5 is an example flow diagram 500 of another alternate embodiment method performed by the three-phase current monitor 120 to identify the highest phase current above a predetermined threshold, which is provided as the signal to the EVSEs. This alternate embodiment method maybe implemented as computer program code stored in the memory 124 and executable by the processor 122 in the three-phase current monitor 120 of FIG. 1A.

The three-phase current monitor 120 provides to each of the EVSEs 100, the signal "S" identifying which phase of the three-phase power source has the highest current. The three-phase current monitor 120 measures the currents IA, IB, and IC in each respective phase A, B, and C using the respective current transformers CT1, CT2, and CT3. The three-phase current monitor 120 identifies at 502 the phase with the highest current. The measured value of the highest current is compared at 504 with a threshold value 130 at 506 and the max phase signal "S" is only transmitted at 508 to the EVSE cluster 150 when the measured value of the highest current is greater than the threshold 130. The max phase signal "S" is not transmitted at 510, unless the measured value of the highest current is greater than the threshold 130. This allows the system capacity to be maximized before any corrective action is taken to balance the system. For example, if the distribution system is able to tolerate the unbalance without performance degradation when the current draw is below a nominal threshold.

The resulting method, apparatus and computer program product resolve the problem of unbalanced loads in an EVSE cluster of multiple EVSE charging stations. A signal is provided to the EVSEs identifying which phase of the three-phase power source has the highest current. When one of the EVSEs in the cluster determines whether it is connected to an EV's onboard charge controller, determines whether it is already charging the connected EV, and determines whether the EVSE is using the phase that has the highest current, then the EVSE may transmit a cluster load balancing signal as a control pilot signal to the EV's onboard charge controller to adjust the charging rate of the current that the EV is consuming from the EVSE.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "component", "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:
   determining, by the charging station, whether a charging device is connected via the charging station to a first phase of a three-phase power source;
   transmitting, by the charging station, a first control signal to adjust a charging rate of the charging device to consume the current from the first phase;
   detecting that the charging device is connected to a second phase of the three-phase power source, wherein the second phase is distinct from the first phase; and
   upon determining that the charging station offers less than a default charging rate to the charging device, transmitting a second control signal to adjust the charging rate of the charging device to consume the current from the second phase of the three-phase power source.

2. The method of claim 1, further comprising:
   determining that the charging device is connected to the first phase based on a signal; and
   transmitting a third control signal to decrease the charging rate of the charging device to consume the current from the first phase of the three-phase power source based on the determination.

3. The method of claim 1, further comprising:
   responsive to detecting that the charging device is connected to the second phase, determining that the charging station offers a default charging rate to the charging device; and
   in response to the determination, maintaining a control signal without modification to not adjust the charging rate of the charging device to consume the current from the second phase.

4. The method of claim 1, further comprising:
   responsive to detecting that the charging device is connected to the second phase, determining, by the charging station, that the charging station offers less than a default charging rate to the charging device; and
   transmitting, by the charging station, a third control signal to increase the charging rate of the charging device to consume the current from the second phase.

5. The method of claim 1, further comprising:
   responsive to detecting that the charging device is not connected to the charging station, determining whether the charging station uses the first phase; and
   if the charging station uses the first phase, then transmitting a third control signal to adjust the charging device consuming the current from the first phase of the three-phase power source.

6. The method of claim 1, further comprising:
   responsive to detecting that the charging device is not connected to the charging station, determining that the charging station uses the first; and
   transmitting a third control signal to inhibit the charging device from consuming the current from the first phase of the three-phase power source.

7. The method of claim 1, further comprising:
   responsive detecting that the charging device is not connected to the charging station, determining that the charging station uses the second phase; and
   activating a new charging session with the charging device for the second phase.

8. The method of claim 1, further comprising:
   receive a signal identifying the first phase as the phase of the three-phase power source having a highest flow of current.

9. A system, comprising:
   one or more computer processors; and
   a memory containing computer program code that, when executed by operation of the one or more computer processors, performs an operation comprising:
   receiving a signal identifying a first phase of a three-phase power source coupled to a charging station as having a highest flow of current relative to other phases of a three-phase power source;
   responsive to detecting that the charging station is connected to a charging device, selecting a second phase of the three-phase power source, the second phase distinct from the first phase; and
   upon detecting that the charging device is connected to the second phase and upon determining that the charging station offers less than a default charging rate to the charging device, transmitting a second control signal to adjust the charging rate of the charging device to consume the current from the second phase of the three-phase power source.

10. The system of claim 9, the operation further comprising:
    determining that the charging device is connected to the first phase based on the signal; and
    transmitting, by the charging station, a second control signal to decrease a charging rate of the charging device to consume current from the second phase of the three-phase power source.

11. The system of claim 9, the operation further comprising:
    determining that the charging station offers less than the default charging rate to the charging device; and
    transmitting a second control signal to increase the charging rate of the charging device to meet the default charging rate based on the determination.

12. The system of claim 9, wherein the processing logic is further to:
    determine that the charging station offers the default charging rate to the charging device; and
    transmit the control signal to partially increase the charging rate of the charging device to consume the current from the second phase of the three-phase power source.

13. A non-transitory computer-readable storage medium comprising executable instructions that when executed, by a processor, cause the processor to:
    receive a signal identifying a first phase of a three-phase power source as having a highest flow of current relative to other phases of the three-phase power source;
    responsive to detecting that the charging station is connected to a charging device, selecting a second phase from the other phases of the three-phase power source;
    cause the charging station to charge to the charging device based on the selection of second phase;
    transmitting a first control signal to adjust a charging rate of the charging device to consume current from the selected second phase; and
    upon determining that the charging station offers less than a default charging rate to the charging device, transmit a second control signal to adjust the charging rate of the charging device to consume the current from the second phase of the three-phase power source.

14. The non-transitory computer-readable storage medium of claim 13, wherein the processor is further to:
    determine that the charging device is connected to the first phase based on the signal; and transmit a third control signal to decrease a charging rate of the charging device to consume current from the second phase.

15. The non-transitory computer-readable storage medium of claim 13, wherein the processor is further to:
determine that the charging station offers less than the default charging rate to the charging device; and
transmit a third control signal to increase the charging rate of the charging device to meet the default charging rate based on the determination.

16. The non-transitory computer-readable storage medium of claim 13, wherein the processor is further to:
determine that the charging station offers the default charging rate to the charging device; and
transmit a third control signal to partially increase the charging rate of the charging device to consume the current from the second phase of the three-phase power source.

\* \* \* \* \*